(12) United States Patent
Tan et al.

(10) Patent No.: US 9,531,859 B2
(45) Date of Patent: Dec. 27, 2016

(54) WRISTBANDS, METHODS FOR CONTROLLING A WRISTBAND, AND COMPUTER READABLE MEDIA

(71) Applicant: RAZER (ASIA-PACIFIC) PTE. LTD., Singapore (SG)

(72) Inventors: Min-Liang Tan, Singapore (SG); Sze Wei Joel Hong, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/653,720

(22) PCT Filed: May 27, 2014

(86) PCT No.: PCT/SG2014/000229
§ 371 (c)(1),
(2) Date: Jun. 18, 2015

(87) PCT Pub. No.: WO2015/189178
PCT Pub. Date: Dec. 3, 2015

(65) Prior Publication Data
US 2016/0119463 A1    Apr. 28, 2016

(51) Int. Cl.
*H04W 88/02* (2009.01)
*H04M 1/725* (2006.01)
(Continued)

(52) U.S. Cl.
CPC ......... *H04M 1/72527* (2013.01); *H04L 67/22* (2013.01); *H04M 1/7253* (2013.01);
(Continued)

(58) Field of Classification Search
CPC ......... H04W 4/02; H04W 8/22; H04W 88/02; H04W 88/04; H04W 88/06; A61B 5/02055; A61B 5/1117; G08B 25/016; G06F 1/163; G06F 1/1605; G06F 3/0482; H04M 1/7253; H04M 1/72527; H04M 1/57; H04M 1/72552; H04M 2250/15; H04L 67/22
See application file for complete search history.

(56) References Cited

U.S. PATENT DOCUMENTS

| 2009/0069045 A1 | 3/2009 | Cheng |
| 2009/0322513 A1 | 12/2009 | Hwang et al. |

(Continued)

FOREIGN PATENT DOCUMENTS

| CN | 102141878 A | 8/2011 |
| CN | 103212197 A | 7/2013 |

(Continued)

OTHER PUBLICATIONS

Warren, Tom, Nokia's multi-display smartwatch concept revealed in patent application, The Verge, Oct. 17, 2013, http://www.theverge.com/2013/10/17/4848050/nokia-smartwatch-patent-multiple-displays.

(Continued)

*Primary Examiner* — Thanh Le
(74) *Attorney, Agent, or Firm* — Polsinelli PC

(57) ABSTRACT

According to various embodiments, a wristband may be provided. The wristband may include: a receiver configured to receive data; a first display; a second display; a display controller configured to control the first display to display first abstract information of a first level of detail based on the received data, and further configured to control the second display to display second abstract information of a second level of detail based on the received data; and a sensor configured to determine a condition of the wristband. The display controller is further configured to control at least one of the first display or the second display based on the determined condition.

24 Claims, 9 Drawing Sheets

(51) Int. Cl.
 H04L 29/08 (2006.01)
 H04M 1/57 (2006.01)
(52) U.S. Cl.
 CPC .............. H04W 88/02 (2013.01); *H04M 1/57* (2013.01); *H04M 1/72552* (2013.01); *H04M 2250/12* (2013.01)

(56) References Cited

U.S. PATENT DOCUMENTS

| | | |
|---|---|---|
| 2011/0059769 A1 | 3/2011 | Brunolli |
| 2011/0187681 A1 | 8/2011 | Kim et al. |
| 2012/0319847 A1 | 12/2012 | Heller |
| 2013/0106684 A1 | 5/2013 | Weast et al. |
| 2013/0222270 A1 | 8/2013 | Winkler et al. |
| 2013/0222271 A1 | 8/2013 | Alberth et al. |
| 2013/0271495 A1 | 10/2013 | Nguyen et al. |
| 2014/0135612 A1 | 5/2014 | Yuen et al. |
| 2014/0281956 A1* | 9/2014 | Anderson ............ G06F 3/0482 715/702 |
| 2015/0199167 A1* | 7/2015 | Sugiyama ............ G06F 1/163 345/2.3 |
| 2015/0220299 A1* | 8/2015 | Kim ................... G06F 1/1605 345/1.3 |
| 2015/0309535 A1* | 10/2015 | Connor ............... G06F 1/163 361/679.03 |

FOREIGN PATENT DOCUMENTS

| | | |
|---|---|---|
| TW | 200913653 A | 3/2009 |
| WO | 2012/170225 A1 | 12/2012 |

OTHER PUBLICATIONS

The Verge, Leaked footage: Nokia's Facet smartwatch concept, Oct. 17, 2013, http://www.youtube.com/watch?v=Bxn_N4vHqXQ.
Kanis et al., iBand—a wearable device for handshake-augmented interpersonal information exchange., Human Connectedness Group, Media Lab Europe, Dublin, Ireland.
Written Opinion of the International Searching Authority mailed Feb. 11, 2015 in the International Application No. PCT/SG2014/000229.
First Office Action mailed Aug. 16, 2016 in corresponding Chinese Patent Application No. 201480006018.0.
First Office Action mailed Oct. 12, 2016 in corresponding Taiwanese Patent Application No. 103118421.

* cited by examiner

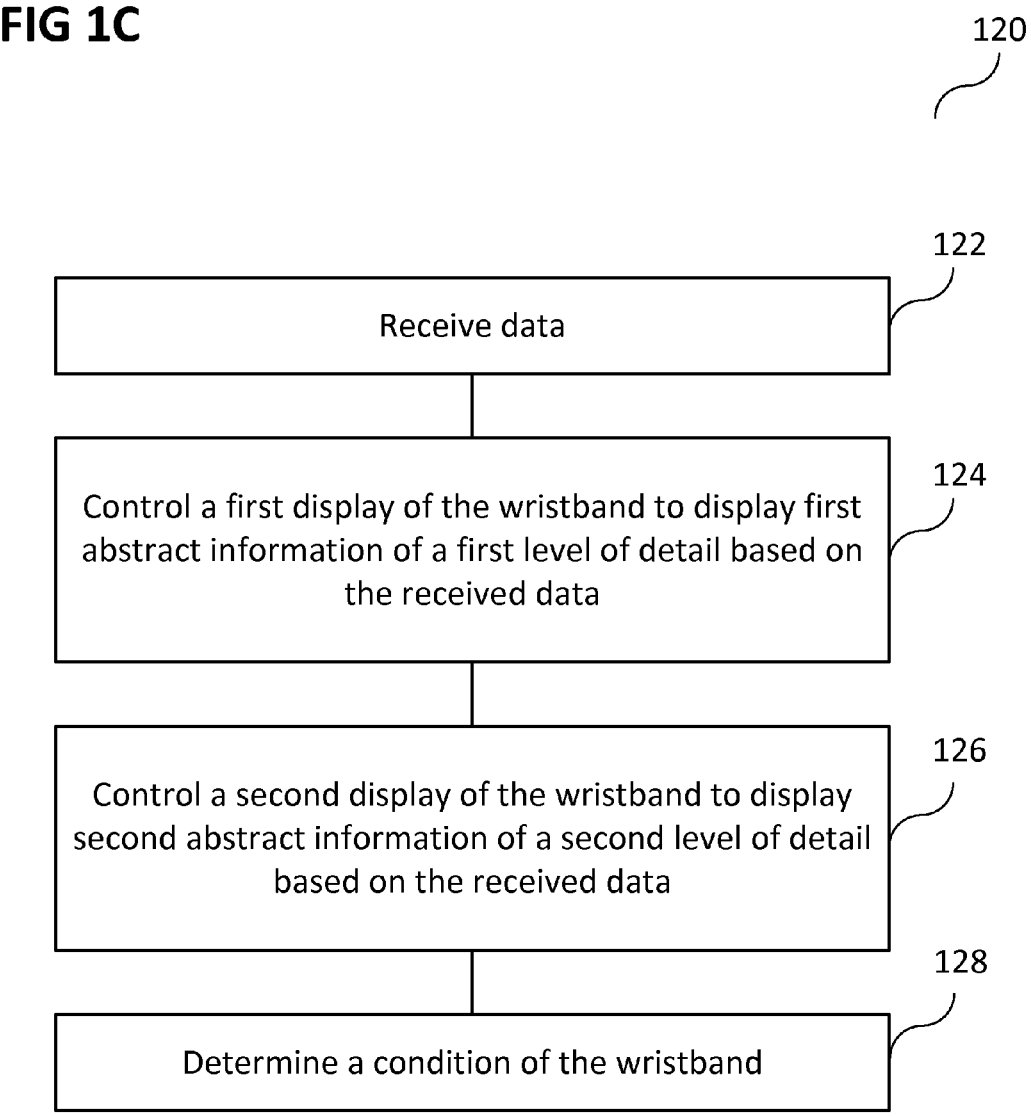

WRISTBANDS, METHODS FOR CONTROLLING A WRISTBAND, AND COMPUTER READABLE MEDIA

CROSS-REFERENCE TO RELATED APPLICATIONS

This application is a national stage entry of PCT/SG2014/000229 filed May 27, 2014, said application is expressly incorporated herein in its entirety.

TECHNICAL FIELD

Various embodiments generally relate to wristbands, methods for controlling a wristband, and computer readable media.

BACKGROUND

Most users need to frequently check their mobile phones to see the latest notifications. This may be a cumbersome process, for example during a meeting with a group of people, where the phone may disturb not only the user, but the entire group of people. Thus, there may be a need for devices and methods to enhance user experience for checking notifications of mobile phones.

SUMMARY OF THE INVENTION

According to various embodiments, a wristband may be provided. The wristband may include: a receiver configured to receive data; a first display; a second display; a display controller configured to control the first display to display first abstract information of a first level of detail based on the received data, and further configured to control the second display to display second abstract information of a second level of detail based on the received data; and a sensor configured to determine a condition of the wristband. The display controller is further configured to control at least one of the first display or the second display based on the determined condition.

According to various embodiments, a method for controlling a wristband may be provided. The method may include: receiving data; controlling a first display of the wristband to display first abstract information of a first level of detail based on the received data; controlling a second display of the wristband to display second abstract information of a second level of detail based on the received data; and determining a condition of the wristband. At least one of the first display or the second display may be controlled based on the determined condition.

According to various embodiments, a computer readable medium may be provided including program instructions which when executed by a processor cause the processor to perform a method for controlling a wristband. The computer readable medium may further including program instructions which when executed by a processor cause the processor to perform: receiving data; controlling a first display of the wristband to display first abstract information of a first level of detail based on the received data; controlling a second display of the wristband to display second abstract information of a second level of detail based on the received data; and determining a condition of the wristband. At least one of the first display or the second display may be controlled based on the determined condition.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1C shows a flow diagram illustrating a method for controlling a wristband according to various embodiments;

DETAILED DESCRIPTION

Figure 1A:
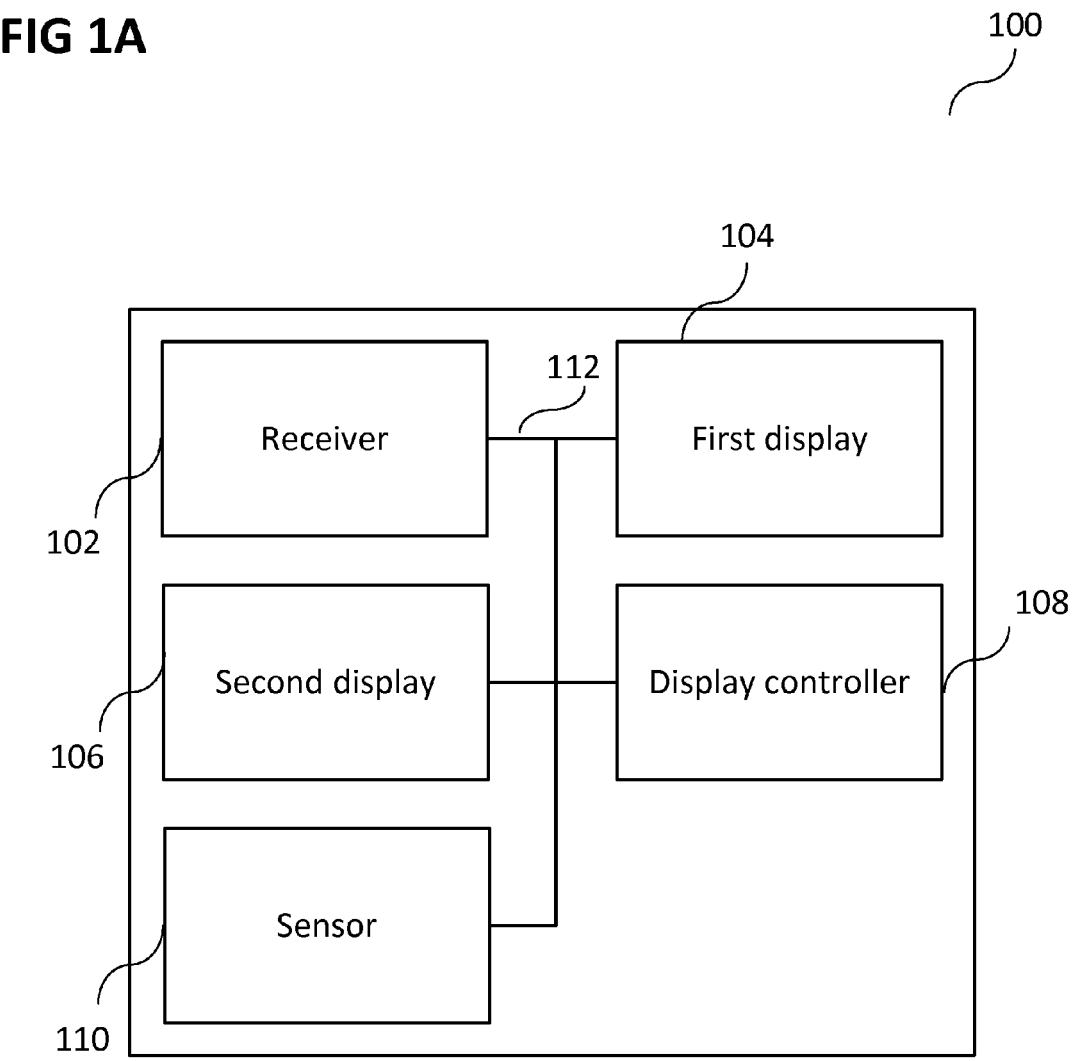
FIG. 1A and FIG. 1B show wristbands according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

In this context, the wristband as described in this description may include a memory which is for example used in the processing carried out in the wristband. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It will be understood that band and wristband may be used interchangeable, and may for example include closed bands or bands which may be opened, for example by a mechanism identical or similar to mechanisms used for watches.

Most users need to frequently check their mobile phones to see the latest notifications. This may be a cumbersome process, for example during a meeting with a group of people, where the phone may disturb not only the user, but the entire group of people. According to various embodiments, devices and methods may be provided to enhance user experience for checking notifications of mobile phones. According to various embodiments, dual screen notification for wearable devices may be provided. A wristband/smartwatch that connects wirelessly to the smartphone may address this situation by providing a visual cue or vibration to alert the user that a notification has been received. This includes providing details of the notification such as for example caller information on the smartwatch or band.

According to various embodiments, a two-screen solution for the wristband may be provided, which may avoid problems of smartwatches which face up toward the user as well as to others around him/her and is unable to keep the information private to the user.

According to various embodiments, the two-screen solution for the wristband may include one display on the top of the wrist to indicate the type of notification by icon and one display on the wrist to provide detailed information. When a notification is received, the user may see what the nature of the notification is on the top screen (such as incoming call). He may then ignore or dismiss the notification or turn his wrist around to face him to view the second screen in a private fashion where the detailed information (such as caller id) will be provided.

A dual private and public screen device may be provided where the private screen discloses more detailed information of the public screen.

FIG. 1A shows a wristband 100 according to various embodiments. The wristband 100 may include a receiver 102 configured to receive data. The wristband 100 may further include a first display 104 and a second display 106. The wristband 100 may further include a display controller 108 (in other words: a display control circuit) configured to control the first display 104 to display first abstract information of a first level of detail based on the received data. The display controller 108 may further be configured to control the second display 106 to display second abstract information of a second level of detail based on the received data. The wristband 100 may further include a sensor 110 configured to determine a condition of the wristband 100. The display controller 108 may further be configured to control at least one of the first display 104 or the second display 106 based on the determined condition. The receiver 102, the first display 104, the second display 106, the display controller 108, and the sensor 110 may be coupled with each other, like indicated by lines 112, for example electrically coupled, for example using a line or a cable, and/or mechanically coupled.

In other words, according to various embodiments, a wristband may be provided with two displays, and information of different levels of detail may be displayed on the two displays, wherein the information displayed on the displays may be based on data received in the wristband and based on a condition of the wristband (for example based on an orientation of the wristband, or for example based on whether the second display is facing a user of the wristband).

Figure 1B:
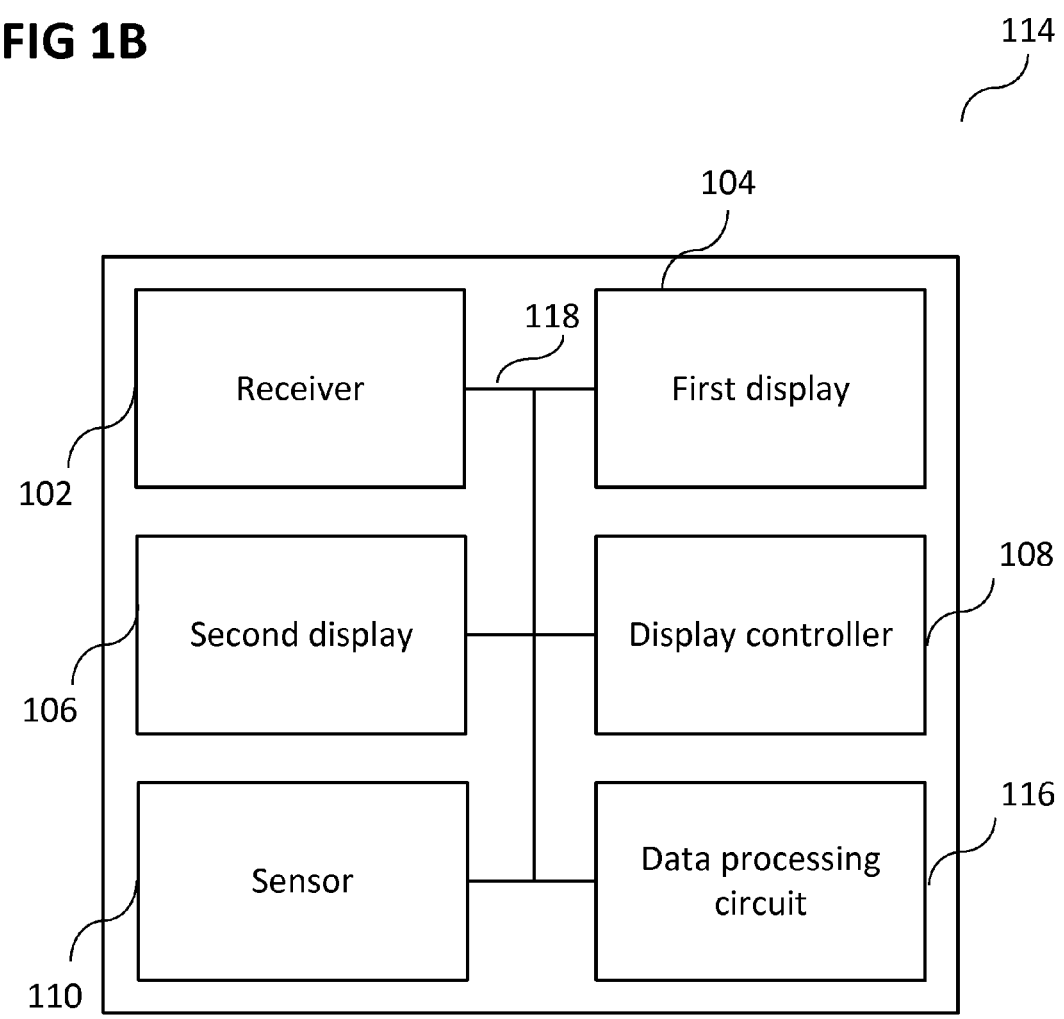

FIG. 1B shows a wristband 114 according to various embodiments. The wristband 114 may, similar to the wristband 100 shown in FIG. 1A, include a receiver 102 configured to receive data. The wristband 114 may, similar to the wristband 100 shown in FIG. 1A, further include a first display 104 and a second display 106. The wristband 114 may, similar to the wristband 100 shown in FIG. 1A, further include a display controller 108 (in other words: a display control circuit) configured to control the first display 104 to display first abstract information of a first level of detail based on the received data. The display controller 108 may further be configured to control the second display 106 to display second abstract information of a second level of detail based on the received data. The wristband 114 may, similar to the wristband 100 shown in FIG. 1A, further include a sensor 110 configured to determine a condition of the wristband 114. The wristband 114 may further include a data processing circuit 116, like will be described in more detail below. The display controller 108 may further be configured to control at least one of the first display 104 or the second display 106 based on the determined condition. The receiver 102, the first display 104, the second display 106, the display controller 108, the sensor 110, and the data processing circuit 116 may be coupled with each other, like indicated by lines 118, for example electrically coupled, for example using a line or a cable, and/or mechanically coupled.

According to various embodiments, the data processing circuit 116 may be configured to determine the first abstract information based on the received data. The data processing circuit 116 may further be configured to determine the second abstract information based on the received data.

According to various embodiments, the first abstract data may include or may be a first subset of information included in the received data. The second abstract data may include or may be a second subset of information included in the received data.

According to various embodiments, the first level of detail may be different from the second level of detail.

According to various embodiments, if the received data includes or is data indicating a telephone call, the first abstract data may include or may be an indication of a telephone, and the second abstract data may include or may be an indication of a caller identifier.

According to various embodiments, if the received data includes or is data indicating a short message, the first abstract data may include or may be an indication of an envelope or a bubble, and the second abstract data may include or may be at least one of an indication of an identifier of a sender of the short message or an indication of the short message.

According to various embodiments, if the received data includes or is data indicating an electronic mail message, the first abstract data may include or may be an indication of an envelope, and the second abstract data may include or may be at least one of an indication of an identifier of a sender of the electronic mail message or an indication of the electronic mail message.

According to various embodiments, if the received data includes or is data indicating a notification from a third party network, for example, a social media network, the first abstract data may include or may be an indication of an icon representing the social media network, and the second abstract data may include or may be at least one of an indication of the notification or mail message from the third party network.

According to various embodiments, the sensor 116 may be configured to determine a condition in which the wristband 114 is; in other words: the sensor 116 may be configured to determine a condition the wristband 114 is in; in other words: the sensor 116 may be configured to determine a condition of the wristband 114.

According to various embodiments, the sensor 116 may include or may be at least one of an accelerometer, a gyroscope, a magnetometer, or a light sensor.

According to various embodiments, the sensor 110 may be configured to detect an acceleration of a user of the wristband 114 based on the motion of the user. The wristband 114 may track and display a number of steps the user has taken based on the acceleration and motion of the user.

According to various embodiments, the display controller 108 may further be configured to control at least one of the first display 104 and the second display 106 based on the determined condition.

According to various embodiments, the display controller 108 may be configured to activate the second display 106 if the wristband 114 is in a condition in which the second display 106 faces a user of the wristband. For example, the wristband 114 may determine whether the second display 106 faces the user of the wristband based on sensor data provided by the sensor 116.

According to various embodiments, the receiver 102 may be configured to receive the data wirelessly.

According to various embodiments, the receiver 102 may be configured to receive the data wirelessly from a mobile phone (not shown in FIG. 1B).

According to various embodiments, the receiver 102 may be configured to receive the data wirelessly from a mobile phone in accordance with at least one radio communication technology selected from a list of radio communication technologies consisting of: a radio frequency communication technology, an optical communication technology, an acoustic communication technology, a Bluetooth communication technology, an infrared communication technology, a ZigBee communication technology, or a wireless local area network communication technology.

FIG. 1C shows a flow diagram 120 illustrating a method for controlling a wristband. In 122, data may be received (in the wristband). In 124, a first display of the wristband may be controlled to display first abstract information of a first level of detail based on the received data. In 126, a second display of the wristband may be controlled to display second abstract information of a second level of detail based on the received data. In 128, a condition of the wristband may be determined. At least one of the first display or the second display may be controlled based on the determined condition.

According to various embodiments, the method may further include: determining the first abstract information based on the received data; and determining the second abstract information based on the received data.

According to various embodiments, the first abstract data may include or may be a first subset of information included in the received data. The second abstract data may include or may be a second subset of information included in the received data.

According to various embodiments, the first level of detail may be different from the second level of detail.

According to various embodiments, if the received data includes or is data indicating a telephone call, the first abstract data may include or may be an indication of a telephone, and the second abstract data may include or may be an indication of a caller identifier.

According to various embodiments, if the received data includes or is data indicating a short message, the first abstract data may include or may be an indication of an envelope or a bubble, and the second abstract data may include or may be at least one of an indication of an identifier of a sender of the short message or an indication of the short message.

According to various embodiments, if the received data includes or is data indicating an electronic mail message, the first abstract data may include or may be an indication of an envelope, and the second abstract data may include or may be at least one of an indication of an identifier of a sender of the electronic mail message or an indication of the electronic mail message.

According to various embodiments, if the received data includes or is data indicating a notification from a third party network, for example, a social media network, the first abstract data may include or may be an indication of an icon representing the social media network, and the second abstract data may include or may be at least one of an indication of the notification or mail message from the third party network.

According to various embodiments, the method may further include determining a condition in which the wristband is using a sensor.

According to various embodiments, the sensor may include or may be at least one of an accelerometer, a gyroscope, a magnetometer, or a light sensor.

According to various embodiments, the sensor may be configured to detect an acceleration of a user of the wristband based on the motion of the user. The wristband 114 may track and display a number of steps the user has taken based on the acceleration and motion of the user.

According to various embodiments, the method may further include controlling at least one of the first display and the second display based on the determined condition.

According to various embodiments, the method may further include activating the second display if the wristband is in a condition in which the second display faces a user of the wristband. This may prolong the battery life. The second display may be switched off by default to conserve energy and to prolong the battery life. The second display may be activated (in other words: may be turned on) only when the wristband is in a condition in which the second display faces a user of the wristband. Furthermore, the second display may act as a privacy screen which prevents a third party from inadvertently reading a notification, message, email which may contain information which the user does not want to disclose.

According to various embodiments, the method may further include receiving the data wirelessly.

According to various embodiments, the method may further include receiving the data wirelessly from a mobile phone.

According to various embodiments, the method may further include receiving the data wirelessly from a mobile phone in accordance with at least one radio communication technology selected from a list of radio communication technologies consisting of: a radio frequency communication technology, an optical communication technology, an acoustic communication technology, a Bluetooth communication technology, an infrared communication technology, a ZigBee communication technology, or a wireless local area network communication technology.

According to various embodiments, a computer readable medium may be provided. The computer readable medium may include program instructions which when executed by a processor cause the processor to perform a method for controlling a wristband, for example the method as described above.

For example, the computer readable medium may include program instructions which when executed by a processor cause the processor to perform: receiving data; and controlling a first display of the wristband to display first abstract information of a first level of detail based on the received data; controlling a second display of the wristband to display second abstract information of a second level of detail based on the received data; and determining a condition of the wristband. At least one of the first display or the second display may be controlled based on the determined condition.

Figure 2:
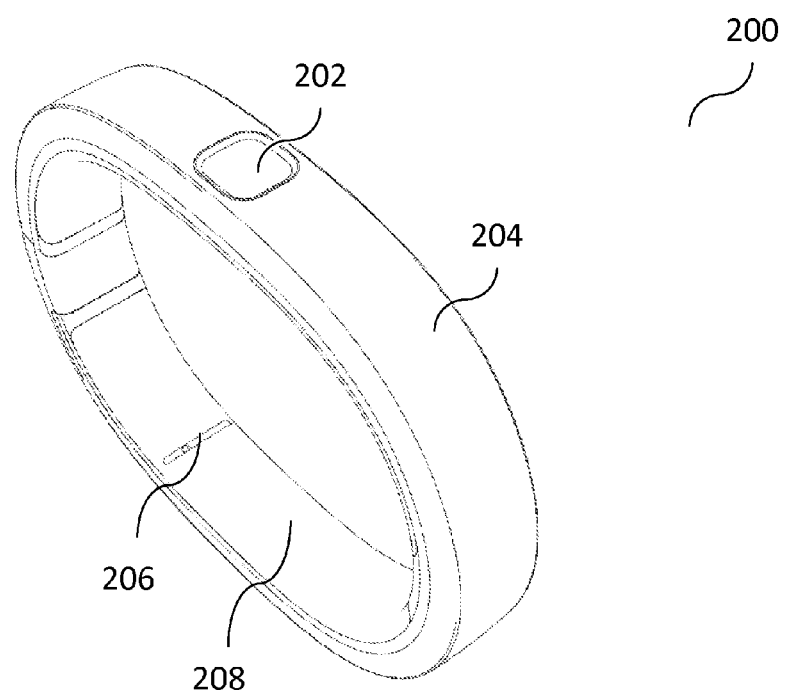
FIG. 2, FIG. 3, and FIG. 4 show three-dimensional views of a wristband according to various embodiments.

FIG. 2 shows a three-dimensional view 200 of a wristband according to various embodiments. A top display 202 may serve as a public display (which may also be referred to as first display). The top display 202 may be coated so that it may be visible only from a pre-determined angle range, which for example may help to keep the information displayed confidential only to the user of the wristband. An outer band 204 (for example a rubber outer band 204) may be provided. A barometer/pressure sensor opening 206 may provide a cover for a barometer or pressure sensor provided inside the band (not shown in FIG. 2). An inner band 208 (for example a glossy plastic inner band 208) may be provided.

Figure 3:
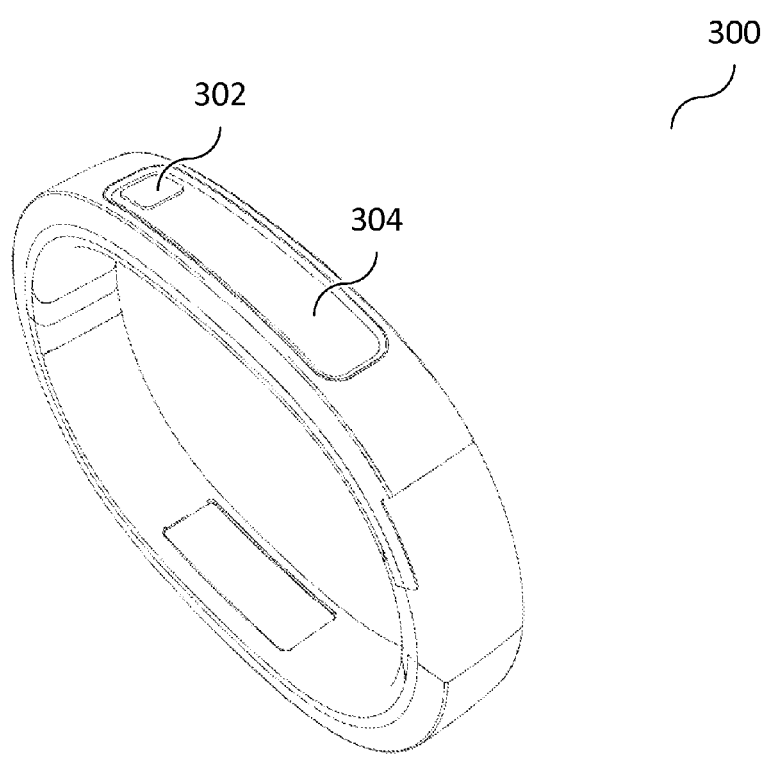

FIG. 3 shows a further three-dimensional view 300 of a wristband according to various embodiments. A button 302 may receive input from a user of the wristband. The button 302 may serve as a means to scroll through the usable features, or the main menu features of the wristband. The usable features or the main menu features of the wristband may include, for example, a notification feature, a clock feature and a fitness data feature. For example, if the wristband is in the clock feature, by pressing the button a single time, the user may be able to access the next available feature of the wristband such as the notification feature, and by pressing the button again, the user may be able access the fitness data feature. For example, when the user is on the fitness data feature, a readout of fitness data may be shown immediately on any one of the screens (in other words: on the first display and/or on the second display). The fitness data may include data or statistics in the form of total number of steps taken in real time, or number of calories burned based on activity. The button 302 therefore allows the user to scroll through the available features of the wristband. To provide additional functions of the wristband, such as a do not disturb function, an airplane mode function, a reset function, or a repair function, a user may press and hold the button for a predetermined length of time. For example, if the user presses and holds the button for 3 seconds and releases the button, this will activate the do not disturb function immediately. For example, when the user presses and holds the button for 5 seconds and releases the button, this will activate the airplane mode function. In other words, different hold and release times may activate different additional functions of the wristband. These hold and release times can be configured by the user according to user preferences. A bottom display 304 may serve as a private display (which may also be referred to as second display). The private display 304 may be coated so that it may be visible only from a pre-determined angle range, which for example may help to keep the information displayed confidential only to the user of the wristband.

Figure 4:
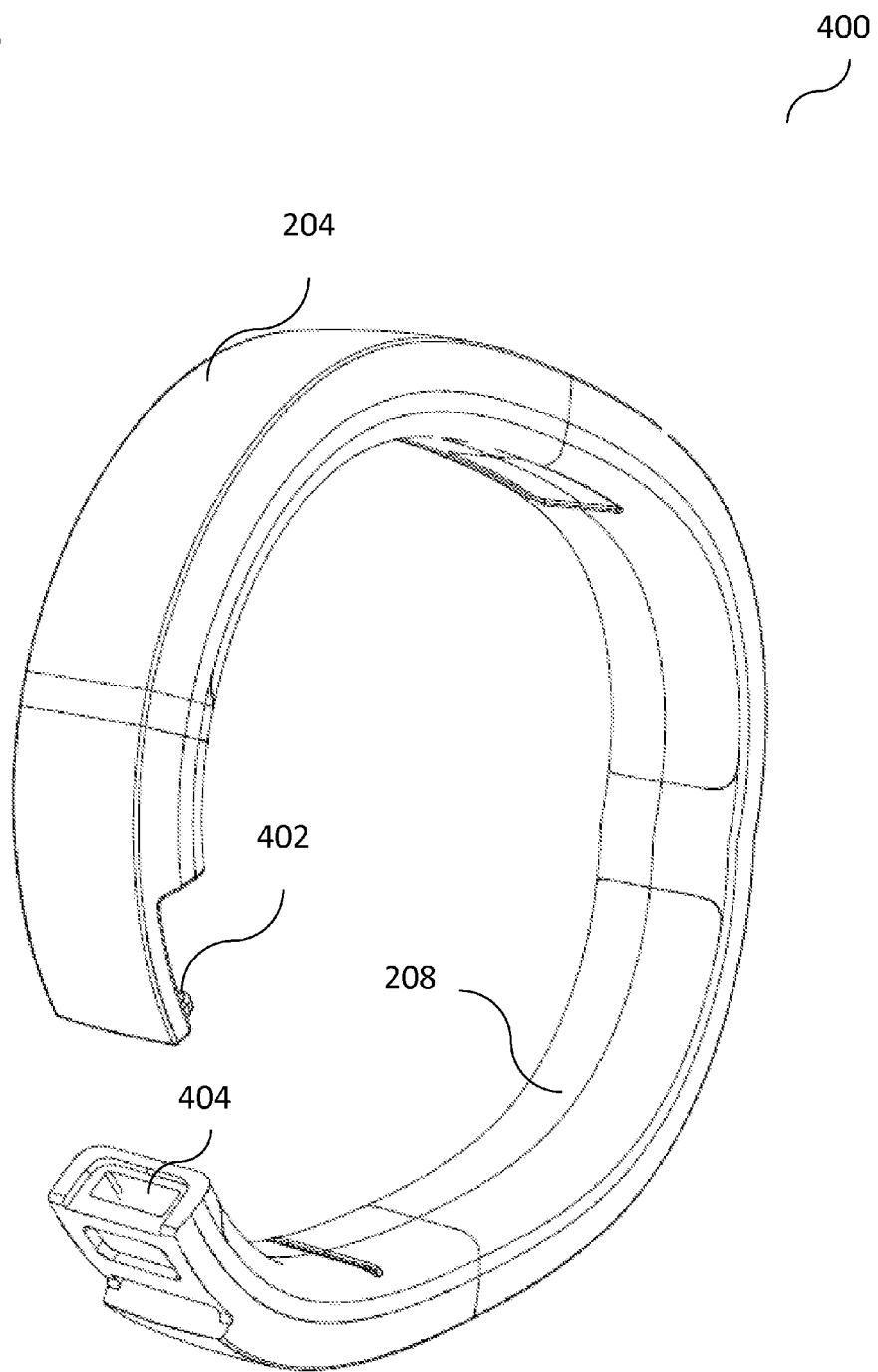

FIG. 4 shows a further three-dimensional view 400 of a wristband according to various embodiments. The wristband is shown as being open in FIG. 4. Various portions of the wristband shown in FIG. 4 may be similar or identical to portions of the wristbands shown in FIG. 2 and FIG. 3, so that the same reference signs may be used and duplicate description may be omitted. A metal clasp 402 may be provided. For example, a logo may be provided on the clasp 402. The clasp may be detachable and replaceable. For example, a long clasp or a short clasp may be used. The user may switch from the long clasp to the smaller clasp to reduce the size of the band.

Furthermore, a USB (universal serial bus) connector 404, for example a Micro USB connector, may be provided. The USB connector 404 may be configured to connect to the PC (personal computer) via a standard micro usb-usb (USB to USB) cable or to charge the band via a phone charger (for example an android phone charger). Thus also allows data to be transferred from the wristband to the PC and vice versa.

Figure 5:
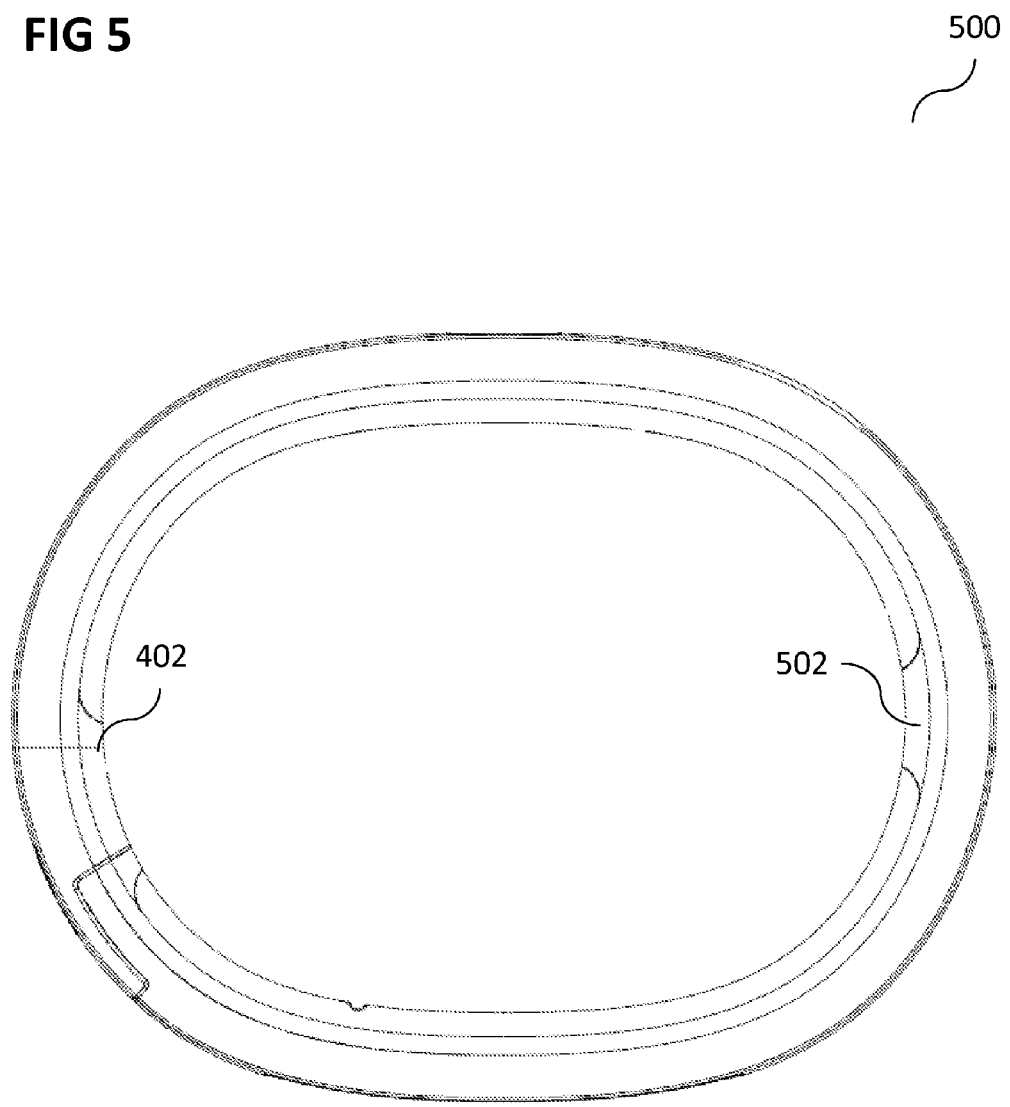
FIG. 5 and FIG. 6 show side views of a wristband according to various embodiments.

FIG. 5 shows a side view 500 of a wristband according to various embodiments. Various portions of the wristband shown in FIG. 5 may be similar or identical to portions of the wristband shown in FIG. 4, so that the same reference signs may be used and duplicate description may be omitted. For example, the clasp 402 may be made from metal (in other words: a metal clasp may be provided). The band may flex at a portion 502.

Figure 6:
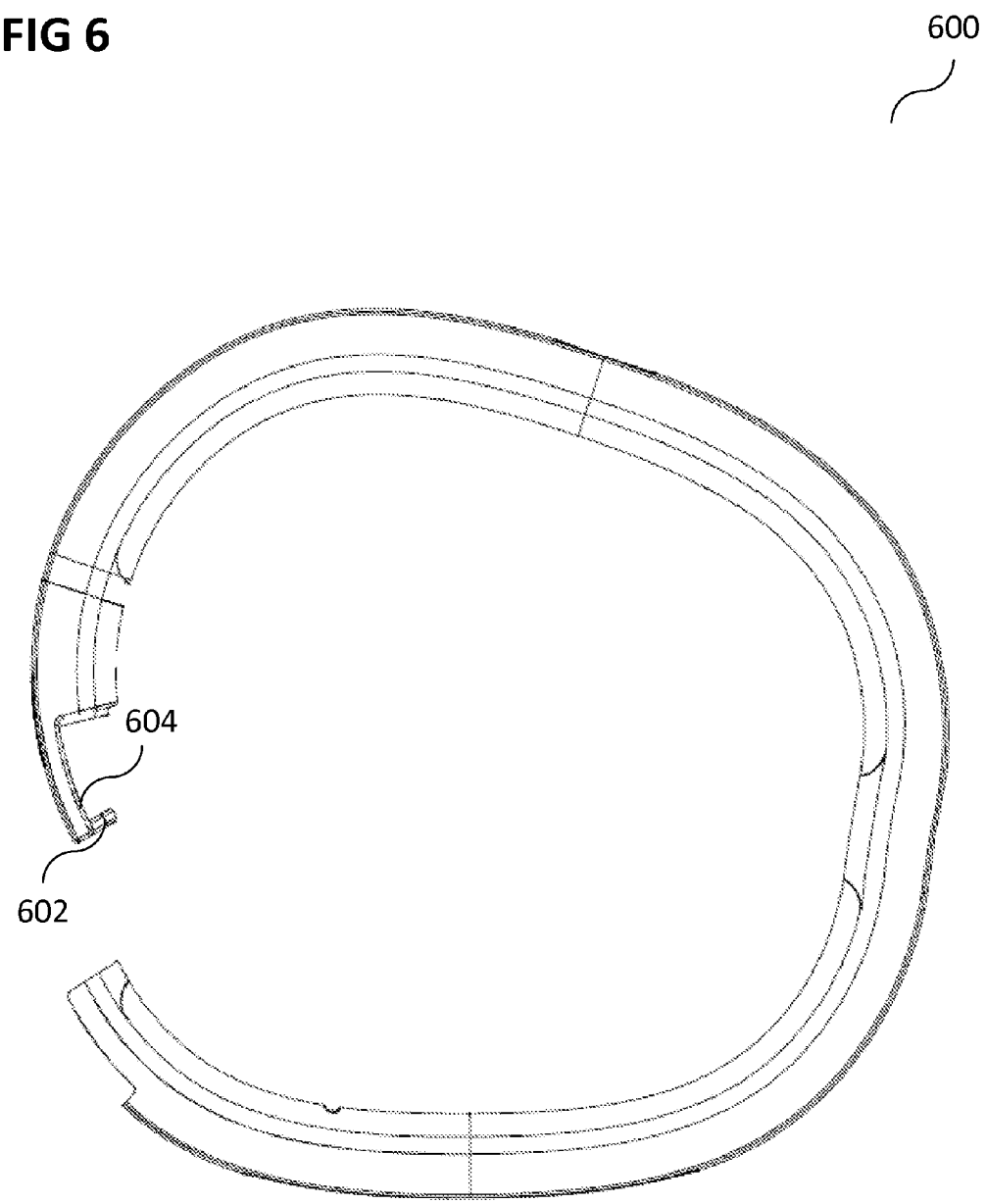

FIG. 6 shows a further side view 600 of a wristband according to various embodiments. A clasp using a double solution to secure the band closed may be provided: A (mechanical) hook 602 on the clasp may grab the band, and furthermore, a magnet or metal 604 may magnetically secure the band in the close position. In FIG. 6, the band is shown while still open.

Figure 7:
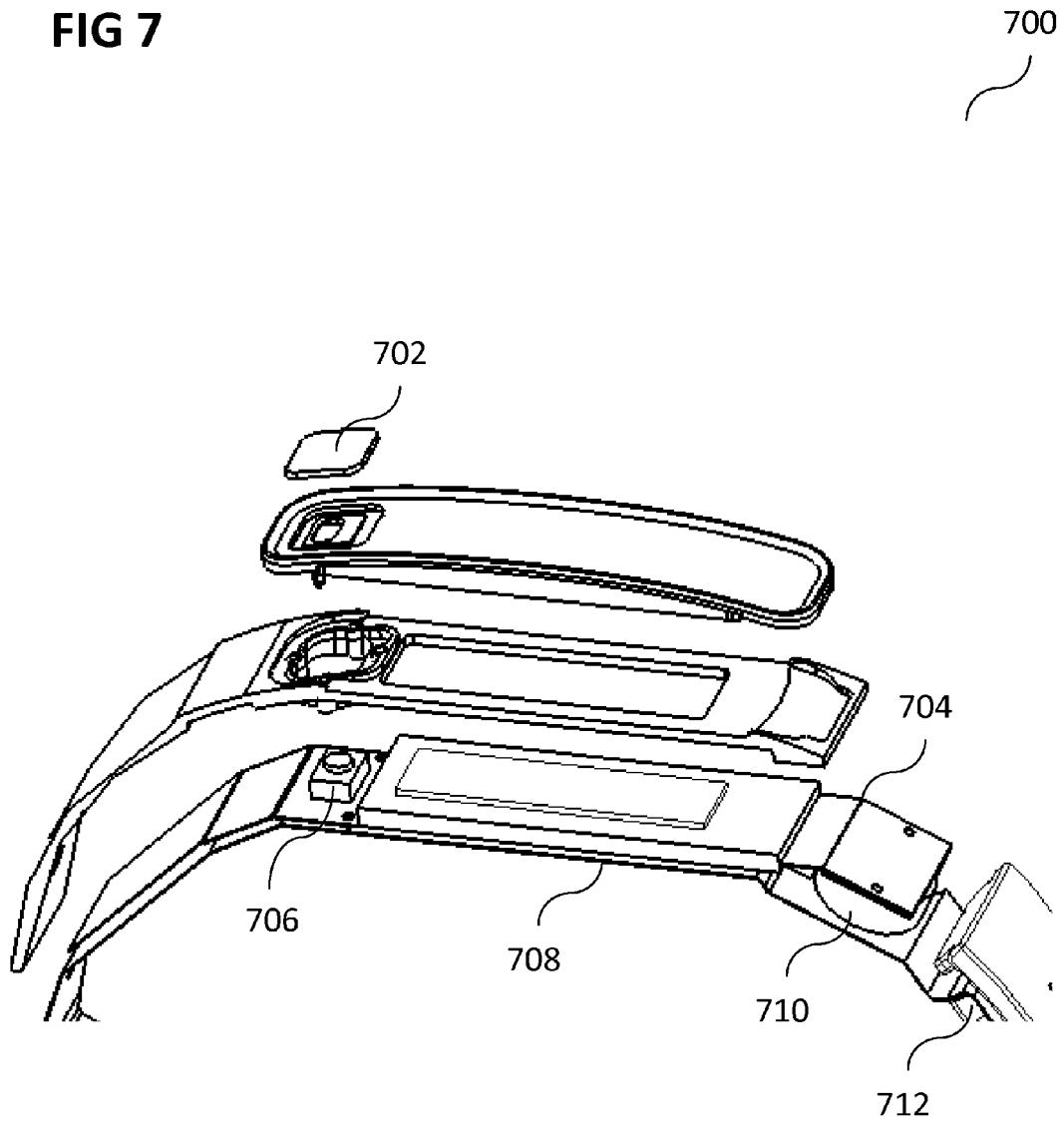
FIG. 7 and FIG. 8 show illustrations of portions of a wristband according to various embodiments.

FIG. 7 shows an illustration 700 of a portion of a wristband according to various embodiments. A button 702, a big OLED (organic light emitting diode) 704 (for example forming at least a portion of the first display), a button switch 706, and altimeter 708 (which may be provided somewhere near the flat surface illustrated in FIG. 7), a vib. (vibration) motor 710, and a USB connector 712 are shown.

Figure 8:
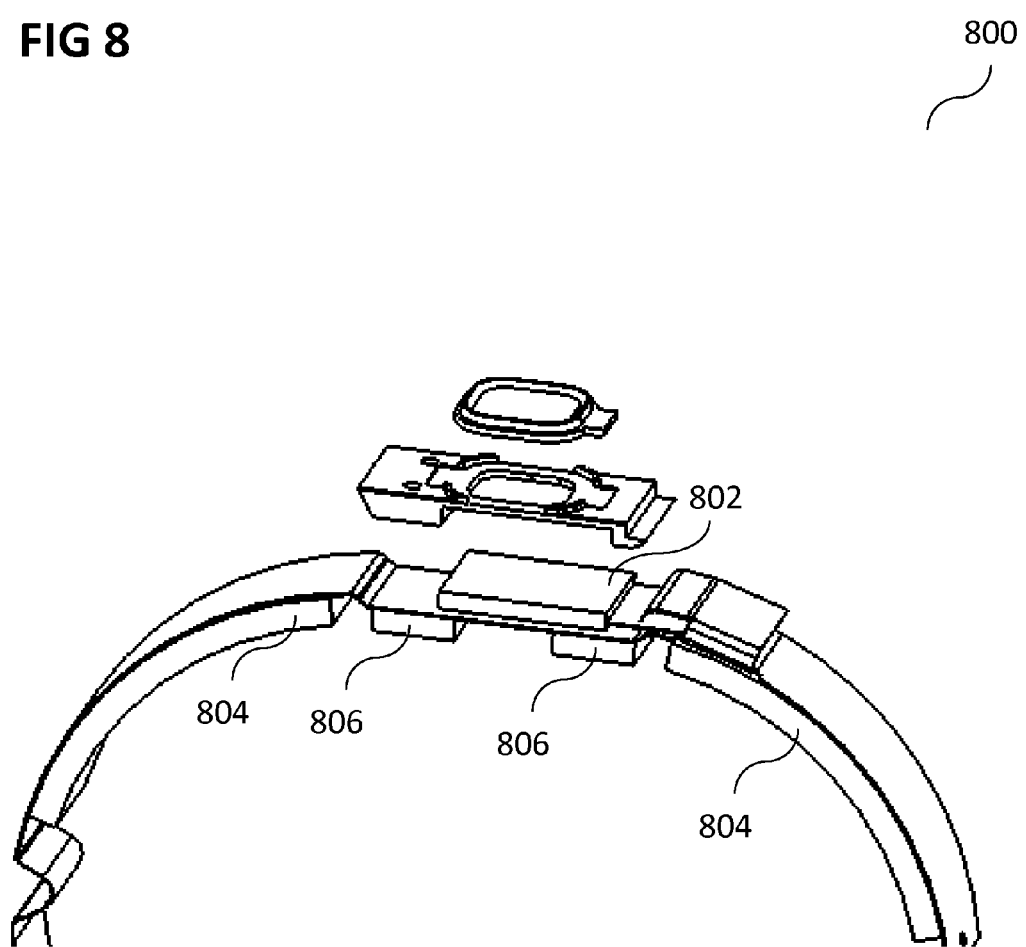

FIG. 8 shows an illustration 800 of a portion of a wristband according to various embodiments. A small OLED 802 (for example forming at least a portion of the second display), a battery 804, and a battery PCM (protection circuit module) 806 may be provided.

The wristband may use its sensor to determine a movement of the wristband. For example, this may allow the user to ignore or mute notifications such as calls or messages received on the wristband by 'shaking it off'. However, a user may configure the wristband such that calls or messages by important people such as the boss or family or close friends cannot be ignored or muted.

The following examples pertain to further embodiments.

Example 1 is a wristband comprising: a receiver configured to receive data; a first display; a second display; and a display controller configured to control the first display to display first abstract information of a first level of detail based on the received data, and further configured to control the second display to display second abstract information of a second level of detail based on the received data; and a sensor configured to determine a condition of the wristband; wherein the display controller is further configured to control at least one of the first display or the second display based on the determined condition.

In example 2, the subject-matter of example 1 can optionally include a data processing circuit configured to determine the first abstract information based on the received data and further configured to determine the second abstract information based on the received data.

In example 3, the subject-matter of any one of examples 1 to 2 can optionally include that the first abstract data comprises a first subset of information included in the received data, and that the second abstract data comprises a second subset of information included in the received data.

In example 4, the subject-matter of any one of examples 1 to 3 can optionally include that the first level of detail is different from the second level of detail.

In example 5, the subject-matter of any one of examples 1 to 4 can optionally include that if the received data comprises data indicating a telephone call, the first abstract data comprises an indication of a telephone, and the second abstract data comprises an indication of a caller identifier.

In example 6, the subject-matter of any one of examples 1 to 5 can optionally include that if the received data comprises data indicating a short message, the first abstract data comprises an indication of at least one of an envelope or a bubble, and the second abstract data comprises at least one of an indication of an identifier of a sender of the short message or an indication of the short message.

In example 7, the subject-matter of any one of examples 1 to 6 can optionally include that if the received data comprises data indicating an electronic mail message, the first abstract data comprises an indication of an envelope, and the second abstract data comprises at least one of an indication of an identifier of a sender of the electronic mail message or an indication of the electronic mail message.

In example 8, the subject-matter of any one of examples 1 to 7 can optionally include that if the received data comprises data indicating a notification from a third party network, the first abstract data comprises an indication of an icon representing the social media network, and the second abstract data comprises at least one of an indication of the notification or mail message from the third party network.

In example 9, the subject-matter of any one of examples 1 to 8 can optionally include that the sensor comprises at least one of an accelerometer, a gyroscope, a magnetometer, or a light sensor.

In example 10, the subject-matter of any one of examples 1 to 9 can optionally include that the sensor is configured to detect an acceleration of a user of the wristband based on a motion of the user; and that the wristband is configured to track and to display a number of steps the user has taken based on the acceleration and motion of the user.

In example 11, the subject-matter of any one of examples 1 to 10 can optionally include that the display controller is configured to activate the second display if the wristband is in a condition in which the second display faces a user of the wristband.

In example 12, the subject-matter of any one of examples 1 to 11 can optionally include that the receiver is configured to receive the data wirelessly.

In example 13, the subject-matter of any one of examples 1 to 12 can optionally include that the receiver is configured to receive the data wirelessly from a mobile phone.

In example 14, the subject-matter of any one of examples 1 to 13 can optionally include that the receiver is configured to receive the data wirelessly from a mobile phone in accordance with at least one radio communication technology selected from a list of radio communication technologies consisting of: a radio frequency communication technology, an optical communication technology, an acoustic communication technology, a Bluetooth communication technology, an infrared communication technology, a ZigBee communication technology, or a wireless local area network communication technology.

Example 15 is a method for controlling a wristband, the method comprising: receiving data; controlling a first display of the wristband to display first abstract information of a first level of detail based on the received data; controlling a second display of the wristband to display second abstract information of a second level of detail based on the received data; and determining a condition of the wristband; wherein at least one of the first display or the second display is controlled based on the determined condition.

In example 16, the subject-matter of example 15 can optionally include: determining the first abstract information based on the received data; and determining the second abstract information based on the received data.

In example 17, the subject-matter of any one of examples 15 to 16 can optionally include that the first abstract data comprises a first subset of information included in the received data, and that the second abstract data comprises a second subset of information included in the received data.

In example 18, the subject-matter of any one of examples 15 to 17 can optionally include that the first level of detail is different from the second level of detail.

In example 19, the subject-matter of any one of examples 15 to 18 can optionally include that if the received data comprises data indicating a telephone call, the first abstract data comprises an indication of a telephone, and the second abstract data comprises an indication of a caller identifier.

In example 20, the subject-matter of any one of examples 15 to 19 can optionally include that if the received data comprises data indicating a short message, the first abstract data comprises an indication of at least one of an envelope or a bubble, and the second abstract data comprises at least one of an indication of an identifier of a sender of the short message or an indication of the short message.

In example 21, the subject-matter of any one of examples 15 to 20 can optionally include that if the received data comprises data indicating an electronic mail message, the first abstract data comprises an indication of an envelope, and the second abstract data comprises at least one of an indication of an identifier of a sender of the electronic mail message or an indication of the electronic mail message.

In example 22, the subject-matter of any one of examples 15 to 21 can optionally include that if the received data comprises data indicating a notification from a third party network, the first abstract data comprises an indication of an icon representing the social media network, and the second abstract data comprises at least one of an indication of the notification or mail message from the third party network.

In example 23, the subject-matter of example 22 can optionally include that the sensor comprises at least one of an accelerometer, a gyroscope, a magnetometer, or a light sensor.

In example 24, the subject-matter of any one of examples 15 to 23 can optionally include: detecting an acceleration of a user of the wristband based on a motion of the user; and tracking and displaying a number of steps the user has taken based on the acceleration and motion of the user.

In example 25, the subject-matter of any one of examples 15 to 24 can optionally include activating the second display if the wristband is in a condition in which the second display faces a user of the wristband.

In example 26, the subject-matter of any one of examples 15 to 25 can optionally include receiving the data wirelessly.

In example 27, the subject-matter of any one of examples 15 to 26 can optionally include receiving the data wirelessly from a mobile phone.

In example 28, the subject-matter of any one of examples 15 to 27 can optionally include receiving the data wirelessly from a mobile phone in accordance with at least one radio communication technology selected from a list of radio communication technologies consisting of: a radio frequency communication technology, an optical communication technology, an acoustic communication technology, a Bluetooth communication technology, an infrared communication technology, a ZigBee communication technology, or a wireless local area network communication technology.

Example 29 is a computer readable medium including program instructions which when executed by a processor cause the processor to perform a method for controlling a wristband, the computer readable medium further including program instructions which when executed by a processor cause the processor to perform: receiving data; controlling a first display of the wristband to display first abstract information of a first level of detail based on the received data; controlling a second display of the wristband to display second abstract information of a second level of detail based on the received data; determining a condition of the wristband; wherein at least one of the first display or the second display is controlled based on the determined condition.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wristband comprising:
a receiver configured to receive data;
a first display;
a second display;
a display controller configured to control the first display to display first abstract information of a first level of detail based on the received data, and further configured to control the second display to display second abstract information of a second level of detail based on the received data; and
a sensor configured to determine a condition of the wristband;
wherein the display controller is further configured to control at least one of the first display or the second display based on the determined condition;
wherein the display controller is further configured to activate the second display to display the second abstract information if the wristband is in a condition in which the second display faces a user of the wristband.

2. The wristband of claim 1, further comprising:
a data processing circuit configured to determine the first abstract information based on the received data and further configured to determine the second abstract information based on the received data.

3. The wristband of claim 1,
wherein the first abstract data comprises a first subset of information included in the received data, and
wherein the second abstract data comprises a second subset of information included in the received data.

4. The wristband of claim 1,
wherein the first level of detail is different from the second level of detail.

5. The wristband of claim 1,
wherein if the received data comprises data indicating a telephone call, the first abstract data comprises an indication of a telephone, and the second abstract data comprises an indication of a caller identifier.

6. The wristband of claim 1,
wherein if the received data comprises data indicating a short message, the first abstract data comprises an indication of at least one of an envelope or a bubble, and the second abstract data comprises at least one of an indication of an identifier of a sender of the short message or an indication of the short message.

7. The wristband of claim 1,
wherein if the received data comprises data indicating an electronic mail message, the first abstract data comprises an indication of an envelope, and the second abstract data comprises at least one of an indication of an identifier of a sender of the electronic mail message or an indication of the electronic mail message.

8. The wristband of claim 1,
wherein if the received data comprises data indicating a notification from a third party network, the first abstract data comprises an indication of an icon representing the social media network, and the second abstract data comprises at least one of an indication of the notification or mail message from the third party network.

9. The wristband of claim 1,
wherein the sensor comprises at least one of an accelerometer, a gyroscope, a magnetometer, or a light sensor.

10. The wristband of claim 1,
wherein the sensor is configured to detect an acceleration of a user of the wristband based on a motion of the user; and
wherein the wristband is configured to track and to display a number of steps the user has taken based on the acceleration and motion of the user.

11. The wristband of claim 1,
wherein the receiver is configured to receive the data wirelessly.

12. The wristband of claim 1,
wherein the receiver is configured to receive the data wirelessly from a mobile phone.

13. The wristband of claim 1,
wherein the receiver is configured to receive the data wirelessly from a mobile phone in accordance with at least one radio communication technology selected from a list of radio communication technologies consisting of: a radio frequency communication technology, an optical communication technology, an acoustic communication technology, a Bluetooth communication technology, an infrared communication technology, a ZigBee communication technology, or a wireless local area network communication technology.

14. A method for controlling a wristband, the method comprising:
- receiving data;
- controlling a first display of the wristband to display first abstract information of a first level of detail based on the received data;
- controlling a second display of the wristband to display second abstract information of a second level of detail based on the received data;
- determining a condition of the wristband;
- wherein at least one of the first display or the second display is controlled based on the determined condition; and
- activating the second display to display the second abstract information if the wristband is in a condition in which the second display faces a user of the wristband.

15. The method of claim 14, further comprising:
- determining the first abstract information based on the received data; and
- determining the second abstract information based on the received data.

16. The method of claim 14,
- wherein the first abstract data comprises a first subset of information included in the received data, and
- wherein the second abstract data comprises a second subset of information included in the received data.

17. The method of claim 14,
- wherein the first level of detail is different from the second level of detail.

18. The method of claim 14,
- wherein if the received data comprises data indicating a telephone call, the first abstract data comprises an indication of a telephone, and the second abstract data comprises an indication of a caller identifier.

19. The method of claim 14,
- wherein if the received data comprises data indicating a short message, the first abstract data comprises an indication of at least one of an envelope or a bubble, and the second abstract data comprises at least one of an indication of an identifier of a sender of the short message or an indication of the short message.

20. The method of claim 14,
- wherein if the received data comprises data indicating an electronic mail message, the first abstract data comprises an indication of an envelope, and the second abstract data comprises at least one of an indication of an identifier of a sender of the electronic mail message or an indication of the electronic mail message.

21. The method of claim 14,
- wherein if the received data comprises data indicating a notification from a third party network, the first abstract data comprises an indication of an icon representing the social media network, and the second abstract data comprises at least one of an indication of the notification or mail message from the third party network.

22. The method of claim 21,
- wherein the sensor comprises at least one of an accelerometer, a gyroscope, a magnetometer, or a light sensor.

23. The method of claim 14, further comprising:
- detecting an acceleration of a user of the wristband based on a motion of the user; and
- tracking and displaying a number of steps the user has taken based on the acceleration and motion of the user.

24. A non-transitory computer readable medium including program instructions which when executed by a processor cause the processor to perform a method for controlling a wristband, the computer readable medium further including program instructions which when executed by a processor cause the processor to perform:
- receiving data;
- controlling a first display of the wristband to display first abstract information of a first level of detail based on the received data;
- controlling a second display of the wristband to display second abstract information of a second level of detail based on the received data;
- determining a condition of the wristband;
- wherein at least one of the first display or the second display is controlled based on the determined condition; and
- activating the second display to display the second abstract information if the wristband is in a condition in which the second display faces a user of the wristband.

* * * * *